Patented Sept. 5, 1950

2,520,917

UNITED STATES PATENT OFFICE 2,520,917

POLYMERS OF CARBOXYAMIDO- AND SULFONAMIDO-STYRENE

Joseph B. Dickey and Theodore E. Stanin, Rochester, N. Y., assignors to Eastman Kodak Company, Rochester, N. Y., a corporation of New Jersey No Drawing. Application March 7, 1945,
Serial No. 581,568

4 Claims. (Cl. 260—85.5)

This invention relates to resins derived from styrenes containing in the styrene molecule on the ring one or more sulfonamide or carboxyamide groups, either polymers or copolymers, which resins are particularly useful for the spinning of textile fibers.

It has been previously recognized that styrene polymerizes to give resins having good strength. It has also been recognized that when styrene is polymerized with a small amount of acrylic acid nitrile that the heat stability of the resulting product is slightly higher than that of polymerized styrene. Fibers prepared from styrene resins, particularly from styrene-acrylic nitrile resins, give fibers with good strength and stretch, but these fibers have been found to be poorly resistant to elevated temperatures, both in the presence of water and under dry conditions.

One object of our invention is to provide polymers of the styrene type in which the heat resistance is considerably greater than that which is ordinarily met within polymeric styrene products. Other objects of our invention will appear herein.

We have found that the heat resistance of the polymers and copolymers of styrene can be considerably enhanced by introducing into the styrene molecule one or more sulfonamide or carboxyamide groups. In addition, the phenyl radicle of the styrene may contain other substituents such as halogen (F, Cl, Br.), hydroxy, alkyl, alkoxy, phenyl, and the like. The —C=C— group may be substituted with other groups including acyloxy and alkyl.

The styrenes having sulfonamide or carboxyamide groups thereon may, in accordance with our invention, be either polymerized or they may be copolymerized with vinyl compounds using one of the various polymerization procedures described in the prior art. The polymerization may be carried out en masse, by a bead polymerization, in the form of a dispersal or solution, under normal pressure conditions or under pressure conditions ranging from normal up to 5000 atmospheres or more. The polymerization may be initiated by one or more of the common polymerization procedures such as by light, heat, oxygen, pressure, organic and inorganic peroxides or some combination of the above. If desired, one of the commonly known polymerization agents such as boron trifluoride, tin chlorides, or aluminum chlorides may be employed.

The sulfonamide radicle may be introduced into the styrene molecule by any method commonly recognized for this purpose which will not interfere with the unsaturated bond. A satisfactory method of preparing compounds of this type is by starting with ethyl benzene and sulfuryl chloride and proceeding through the following series of reactions, these being reactions the use of which is commonly recognized in organic chemistry:

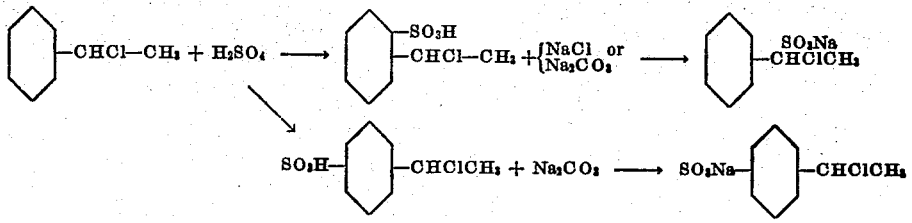

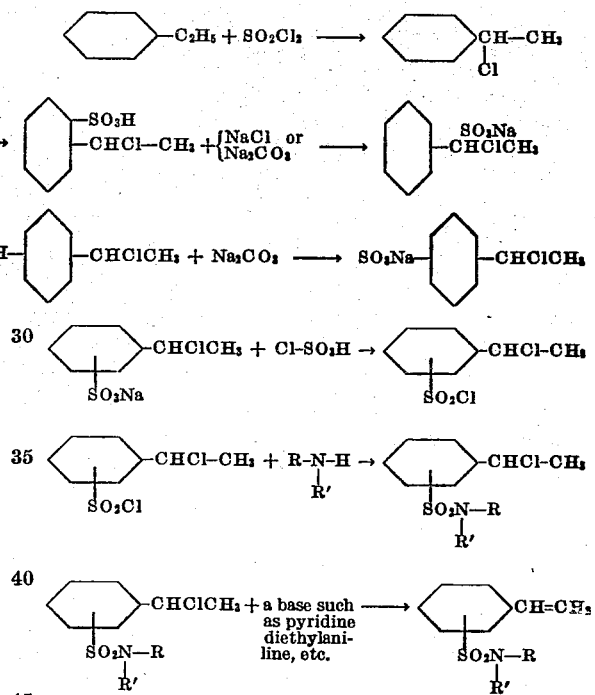

In the above formulas, R and R' may be alkyl, aryl, heterocyclic, (tetrahydrofurfuryl) alkylene, (methylene, ethylene) hydrogen, hydrazine, (phenyl hydrazine) or the like and these groups may be either substituted or unsubstituted, the sole criterion being that these substituents do not interfere with the course of the reaction.

This reaction can be generally applied to introduce more than one sulfonamide group, and, if desired, substituted alkyl benzenes such as those represented by the general formula:

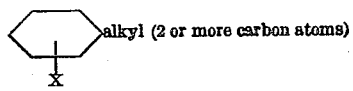

wherein X is selected from carboxyl, alkyl, halogen, acylamides, ketone, sulfone, etc., substituted in either of the ortho, meta, or para position may be employed as the starting material for preparing sulfonamide desired.

For the preparation of the carboxyamide, ethyl benzene or a substituted ethyl benzene may be used as the starting material and the following set of equations may be employed to obtain the desired compound:

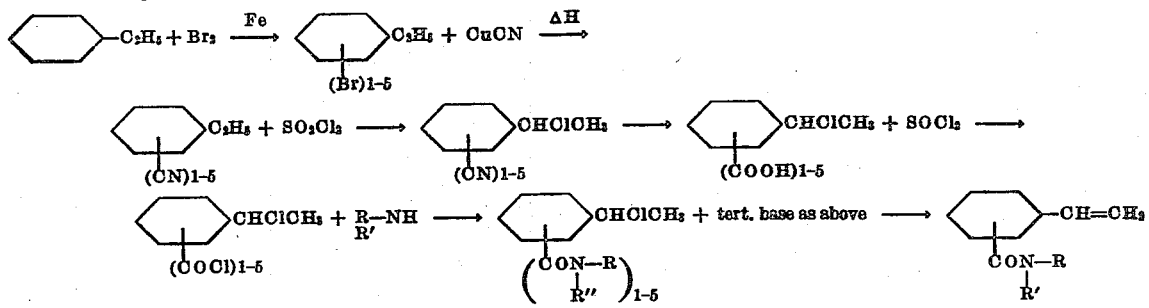

In the above formulas, R and R' may be any of the groups designated by these characters in the explanation of the reactions for preparing the sulfonamides. Each of the steps designated above are well known organic reactions and are carried out in accordance with the methods ordinarily employed in organic chemistry. In the above preparation of carboxyamides a substituted alkyl benzene might be employed as the starting material, as was explained with reference to the starting material of the sulfonamide.

The placing of sulfonamido groups on alkyl benzenes is known in the art as shown in Beilstein, vol. 11, pages 119 and 120, wherein an article by Sempotowski, Berichte, vol. 22, page 2672 is referred to. The conversion of the ethyl group of ethyl benzene to an unsaturated radicle is shown in Ellis "The Chemistry of Synthetic Resins," vol. 1, pages 252 and 253. On page 252, line 27, this text points out that chlorethyl benzene forms when ethyl benzene is chlorinated below 30° C. Further on, this text points out that treatment with pyridine will cause the formation of the unsaturated substituent. Also on page 253, lines 12 to 14, this text shows that this procedure is useful for analogues of styrene. Berichte 29, 2535, in an article by Gube, shows ethyl benzene containing carboxyamide groups was known in 1896. This, coupled with the disclosure in Ellis given above, constitutes a teaching to anyone skilled in the art of the preparation of the carboxyamido compounds used as the starting material in the preparation of polymers as described herein.

If it is desired to prepare the copolymer, the sulfamido or carboxyamido styrenes may be polymerized with vinyl monomers, the latter preferably in small proportions such as up to 20% of the total mixture. The styrene carboxy and sulfonamide compounds may be present in any desired amount. Some of the polymerizable monomers, both vinyl and non-vinyl which may be employed for copolymerizing with the carboxyamido and sulfonamide styrenes are the following: iso-butylene, vinyl acetate, vinyl methyl ketone, vinyl chloride, vinyl fluoride, vinylidine difluoride, vinylidine dichloride, vinylidine fluoride chloride, styrene, vinyl methyl ether, β-cyanovinylmethyl ether, vinyl-β-cyanoethyl ether, vinylmethylsulfone and sulfoxide, methyl acrylate,

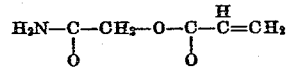

ethylene, tetrafluoroethylene, methyl fumarate, fumaramide, acrylic acidamides, acrylonitrile, crotononitrile, vinyl urethane, fumaronitrile, β-cyanoacrylic acidamides, β-cyanoalkyl acrylates and the like. For the preparation of fibrous materials acrylonitrile has been found to be of value, and, therefore, this material is employed for copolymerization with the sulfamido and carboxyamido styrenes for the making of fabrics. In preparing the polymers one or more of the above monomers may be copolymerized with one or more of the sulfonamido, styrenes, or the carboxyamido styrenes in any desired amount. For instance, in some cases equal parts of the vinyl monomer and the sulfonamide styrene prove to be satisfactory. This also holds true in the case of carboxy styrenes. In other cases but a small proportion such as 10–30% of the sulfonamido styrene or carboxyamido styrene is sufficient to give the desired results. The following examples illustrate the preparation of resins in accordance with our invention.

*Example 1.*—Eighteen parts of p-sulfamido styrene were mixed with 6 parts of acrylonitrile and 0.02 part of benzoyl peroxide. The mass was heated in a sealed tube at 50° C. for two days. When cooled, the tube was opened and the tough solid product was purified by dissolving in pyridine and poured into water. Instead of pyridine some other suitable solvent might be employed as a substitute therefor in the process. If desired, during the polymerization the tube may be exposed to ultraviolet light to facilitate the polymerization operation. To obtain fibers from this polymer it is dissolved in acetone and the fibers are spun from that solution.

*Example 2.*—Twenty-one parts of a mixture of o-, m-, and p-ethylsulfamido styrenes were mixed with 18 parts of acrylonitrile, and 0.03 parts of benzoyl peroxide. The mass was polymerized by the procedure employed in the preceding example. The polymerization was stopped when a sample shows that the polymerization is about 60% complete. The polymer is recovered from the mass by the method employed in the preceding example. If desired, in a polymerization of this type, some other material such as phenyl α-naphthylamine or hydroquinone might be added at the desired moment to destroy the catalyst and stop the polymerization.

*Example 3.*—Fifteen parts of p-carboxyamido styrene were mixed with 10 parts of methyl acrylate and 5 parts of N-propylacrylamide, 0.03 part of a mixture of benzoyl peroxide and acetyl peroxide were added and polymerization was started by raising the temperature to 40° C. and continuing to increase the temperature to 75° C. over a period of several days. The product was worked up as described in the preceding examples.

Example 4.—A mixture of 21 parts of p-di-N-methylsulfamido styrene, 20 parts of methyl isopropenyl ketone and 0.03 part of benzoyl peroxide were heated at 50° C. for several days in a sealed tube and then slightly raised to 75° C. A hard tough product was obtained suitable for the preparation of films, fibers, or molded products. The resin is recovered from the polymeric mass in the same manner as described in the preceding examples.

Example 5.—A mixture of 5 parts of

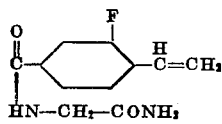

25 parts of vinyl chloride and 0.01 part of benzoyl peroxide were heated at 50° C. in an autoclave under 300 atmospheres pressure, having an atmosphere of nitrogen therein. After two days the temperature was slightly raised to 75° C. When cool, the resin formed was dissolved in pyridine and precipitated by pouring into water. The resulting product was suitable for preparation of fibers which involved dissolving it into acetone and spinning the acetone solution.

Example 6.—A mixture of 11 parts of

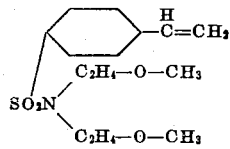

6 parts of vinyl chloride, and 8 parts of vinyl acetate were polymerized in the presence of 0.05 part of benzoyl peroxide in a closed vessel beginning at 30° C. The temperature was slightly raised to 80° C. A slightly yellow tough solid resulted which was purified by the procedure specified in Example 1. This solid was suitable for use in preparing fibers, films, molded products or the like.

Example 7.—A mixture of 5 parts of

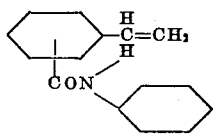

50 parts of vinylidine dichloride, 1 part of acrylonitrile, 0.1 part of benzoyl peroxide, 200 parts of water and 0.4 part of gum arabic were placed in a container with about 10% free space and tumbled at 50 R. P. M. at a temperature of approximately 50° C. Polymerization is continued until complete and the product is removed in the form of beads. It is advantageous to carry out a polymerization of this type at an elevated pressure such as 1000 atmospheres or more using an autoclave, imparting pressure by pumping in inert gas such as nitrogen, methane, or the like.

Example 8.—Three parts of

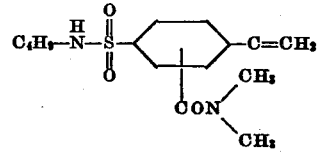

2 parts of

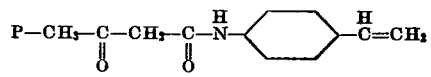

31 parts of styrene, 0.5 part of urea peroxide, 55 parts of water, 0.9 part of gelatin, 0.05 part of 2-ethylhexanol, 0.189 part of sodium ethyl naphthalene sulfonate, and 0.067 part of carbon tetrachloride were mixed together so as to form an emulsion, and this mixture was shaken for 3-4 days at 50-60° C. The resulting polymer was precipitated by adding dilute mineral acid thereto to break the emulsion. The precipitated product was then filtered, washed, and dried.

Example 9.—An emulsion was formed consisting of 6 parts of

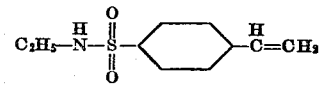

16.2 parts of butadiene, 2 parts of fumaronitrile, 0.5 part of urea peroxide, 0.9 part of gelatin, 0.05 part of ethyl hexanol, 0.07 part of carbon tetrachloride, and 0.2 part of sodium ethyl naphthalene sulfonate, and the emulsion was shaken for 3-5 days at a temperature of 50-60° C. The polymer formed was precipitated by adding dilute hydrochloric acid to the mass to break the emulsion. Hydroquinone was added to destroy the catalyst. The resulting yellowish polymer was filtered off, washed, and dried. The tough solid thus obtained was suitable for preparing fibers, films, or the like and also was susceptible to vulcanization. Instead of butadiene, butadiene derivatives may be employed to prepare polymers as outlined in this example. Some of the butadienes which might be employed are 2-chlorobutadiene, 2-chloro-3-fluorobutadiene, 1 and 2-acetoxybutadiene, 2 or 3-chloro-4-acetoxybutadiene, 2-methyl-3-chlorobutadiene, and 2-cyanobutadiene.

Example 10.—Five parts of

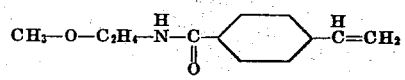

were placed in a shaking autoclave and ethylene was pumped in until a pressure of 1500 atmospheres was reached. The reaction mixture was heated at 180° C. for approximately 23 hours, cooled, and the reaction product was removed. The resulting material was a hard, tough solid capable of being spun into fibers from solution. This reaction was repeated except that in one case propylene was employed, another of ethylene and in the other case iso-butylene was used in this manner. In each case a product similar to that obtained in Example 10 was obtained.

Example 11.—Ten parts of

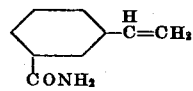

20 parts of vinyl acetate, and 20 parts of vinylidine dichloride were mixed together and heated in a sealed tube with 0.05 part of benzoyl peroxide at 50° C. for several days. The resulting polymer is a tough solid suitable for preparing filaments.

*Example 12.*—Five parts of

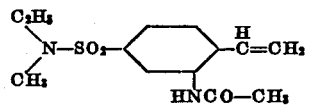

were mixed with 5 parts of methylacrylate, 5 parts of methyl fumarate, and 5 parts of methyl vinyl sulfone, and the mixture was polymerized together in the manner described in the preceding example. The product was a slightly yellow tough solid capable of being molded.

*Example 13.*—Ten parts of

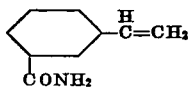

were mixed with 20 parts of vinyl methyl ether and 50 parts of styrene, and the mixture was polymerized in the presence of 0.04 part of benzoyl peroxide in the same manner as the polymerization was carried out in Example 1.

*Example 14.*—Ten parts of

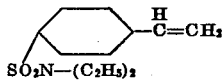

10 parts of p-(N-p-tolylsulfonamido) styrene, and 0.01 part of benzoyl peroxide were all mixed together by dissolving in acetic acid. The solution was slowly heated up to 150° C. over a period of several days. The mixture was cooled and purified as described in the preceding examples. A yellowish high-melting solid was obtained.

We claim:

1. A polymer suitable for the spinning of textile fibers therefrom resulting from the polymerization of a mixture of approximately 9–75%, based on the total polymerization material therein, of styrene containing on the ring thereof 1–2 groups selected from the group consisting of sulfonamide and carboxyamide, when 2, the groups being one of each, and a compound containing a polymerizable group represented by the formula:

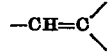

2. A polymer suitable for the spinning of textile fibers therefrom resulting from the polymerization of a mixture of approximately 9–75%, based on the total polymerization material therein, of styrene containing on the ring a sulfonamide group and a compound containing a polymerizable group represented by the formula:

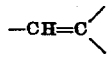

3. A polymer suitable for the spinning of textile fibers therefrom resulting from the polymerization of a mixture of approximately 9–75%, based on the total polymerization material therein, of styrene containing on the ring a carboxyamide group and a compound containing a polymerizable group represented by the formula:

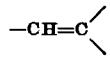

4. A polymer suitable for the spinning of textile fibers therefrom resulting from the polymerization of a mixture of acrylonitrile and approximately 54–75%, based on the total polymerizable material therein of styrene, containing on the ring thereof 1–2 groups selected from the group consisting of sulfonamide and carboxyamide, when 2, the groups being one of each.

JOSEPH B. DICKEY.
THEODORE E. STANIN.

No references cited.